(No Model.)

6 Sheets—Sheet 1.

E. M. BOYNTON.
ELECTRIC LOCOMOTIVE.

No. 496,550.

Patented May 2, 1893.

WITNESSES:
D. C. Reusch.
W. H. Boynton.

INVENTOR
Eben Moody Boynton (No Model.)

E. M. BOYNTON.
ELECTRIC LOCOMOTIVE.

No. 496,550. Patented May 2, 1893.

6 Sheets—Sheet 2.

WITNESSES:
D. C. Reusch.
W. H. Boynton.

INVENTOR
Eben Moody Boynton (No Model.)

E. M. BOYNTON.
ELECTRIC LOCOMOTIVE.

No. 496,550.

6 Sheets—Sheet 5.

Patented May 2, 1893.

WITNESSES:
D. C. Reusch.
W. H. Boynton.

INVENTOR
Eben Moody Boynton (No Model.)

6 Sheets—Sheet 6.

E. M. BOYNTON.
ELECTRIC LOCOMOTIVE.

No. 496,550.

Patented May 2, 1893.

WITNESSES:
D. C. Reusch.
H. H. Boynton

INVENTOR
Eben Moody Boynton

UNITED STATES PATENT OFFICE.

EBEN MOODY BOYNTON, OF WEST NEWBURY, MASSACHUSETTS.

ELECTRIC LOCOMOTIVE.

SPECIFICATION forming part of Letters Patent No. 496,550, dated May 2, 1893.

Application filed December 7, 1891. Serial No. 414,255. (No model.)

*To all whom it may concern:*

Be it known that I, EBEN MOODY BOYNTON, a citizen of the United States, and a resident of West Newbury, in the county of Essex and State of Massachusetts, have invented certain new and useful Improvements in Electric Motors, of which the following is a specification.

My invention is primarily intended for use on electric cars of moderate weight and running at a high rate of speed.

The objects of my invention are the reduction of the weight of the motor, the avoidance of the danger of overheating the armature, the reduction of the number of moving parts in the motor, and the general simplification of the same. Among the advantages gained by me are narrowness of the motor, thus allowing its use in places from which it is at present excluded, and the relief of the driving shaft from the weight of the armature and spider.

To these ends my invention consists of the combination of a driving wheel, an armature or armatures rigidly secured to the web thereof, and field magnets placed adjacent the armature and acting thereon. It is obvious that there are three main positions in which the field magnets may be placed:—at distances from the axis of the wheel equal to, less or greater than the distance of the armature therefrom. It is to be noted, that in some cases, there may be a set of field magnets on each side of the wheel, each set acting, it may be, on independent, or it may be on the same armature secured to the web of the wheel.

The accompanying drawings illustrate a preferred form of the motor, that would perhaps be applicable for the same purpose as illustrated in my application for a patent on "electric motors for bicycle cars," filed April 20, 1891, Serial No. 389,564, to which I therefore refer.

Figure 1:
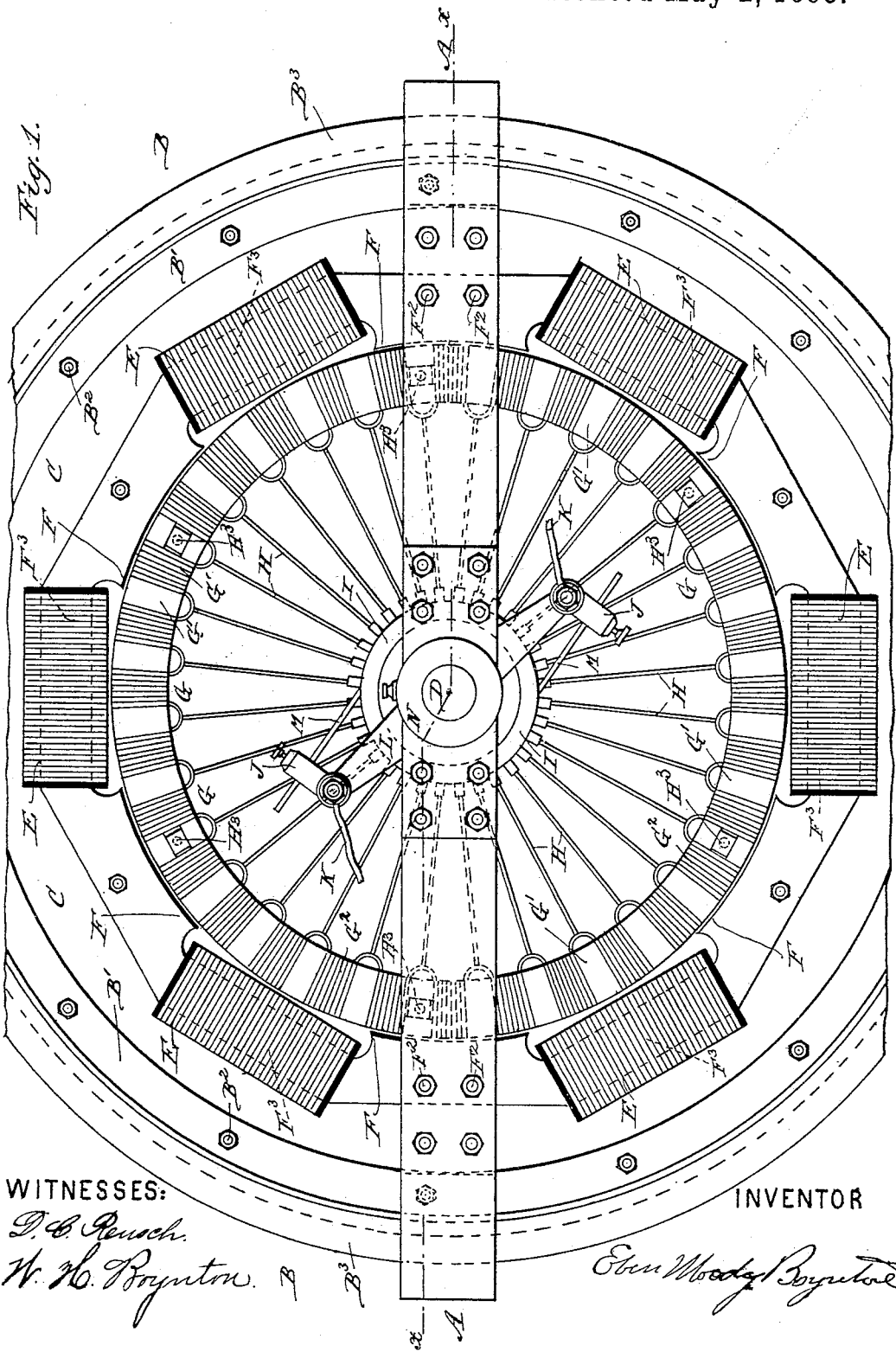
Figure 2:
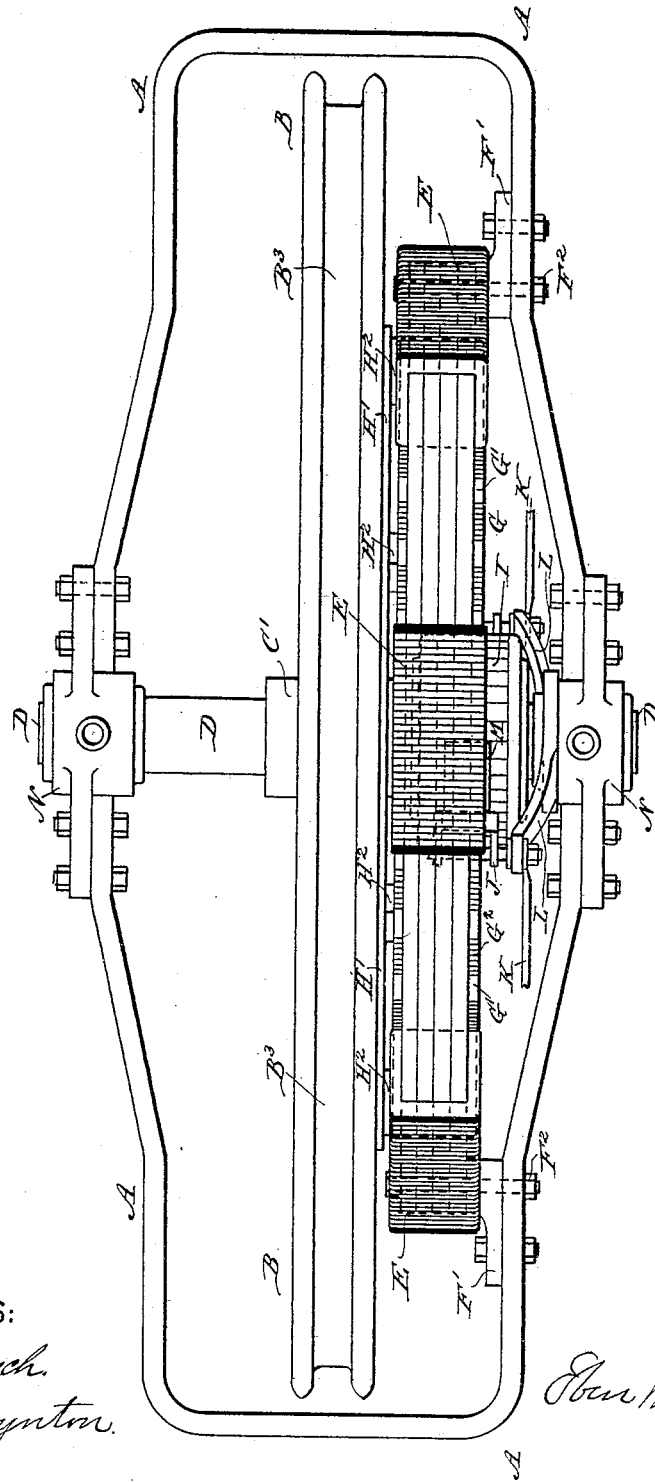
Figure 3:
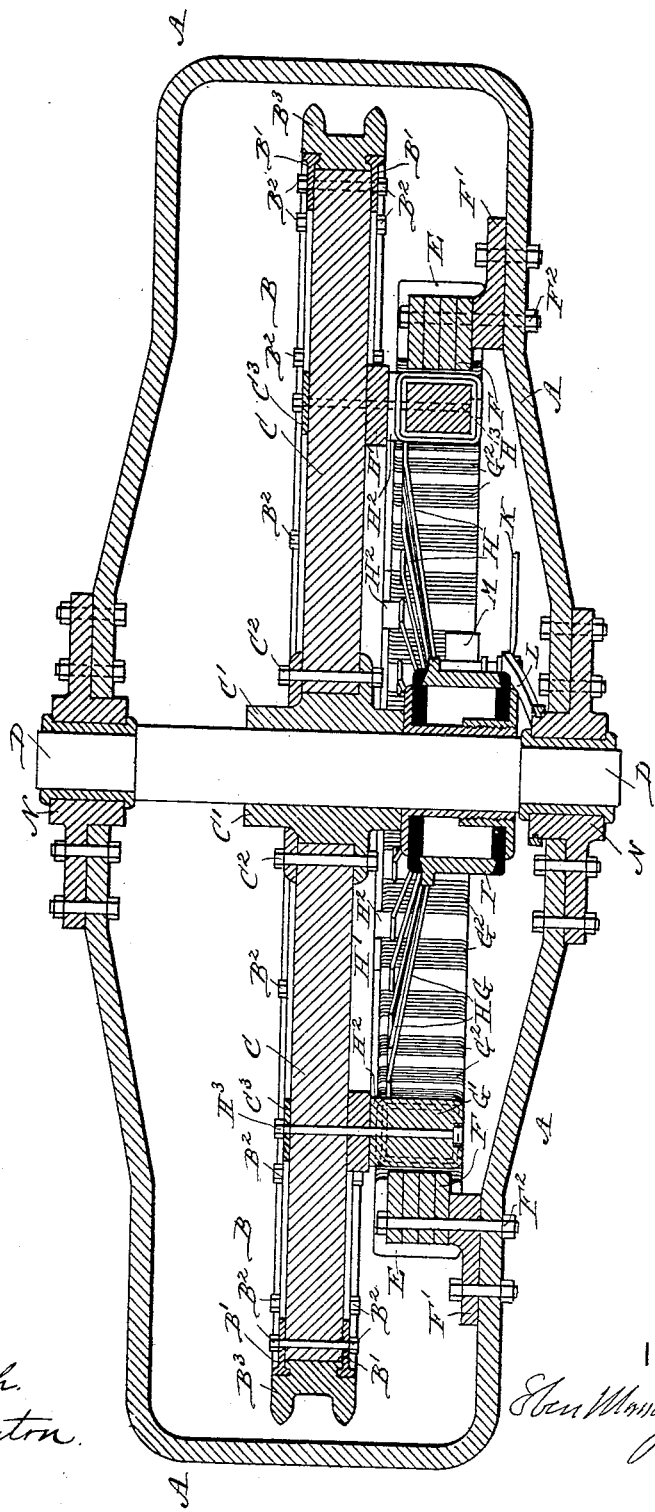
Figure 4:
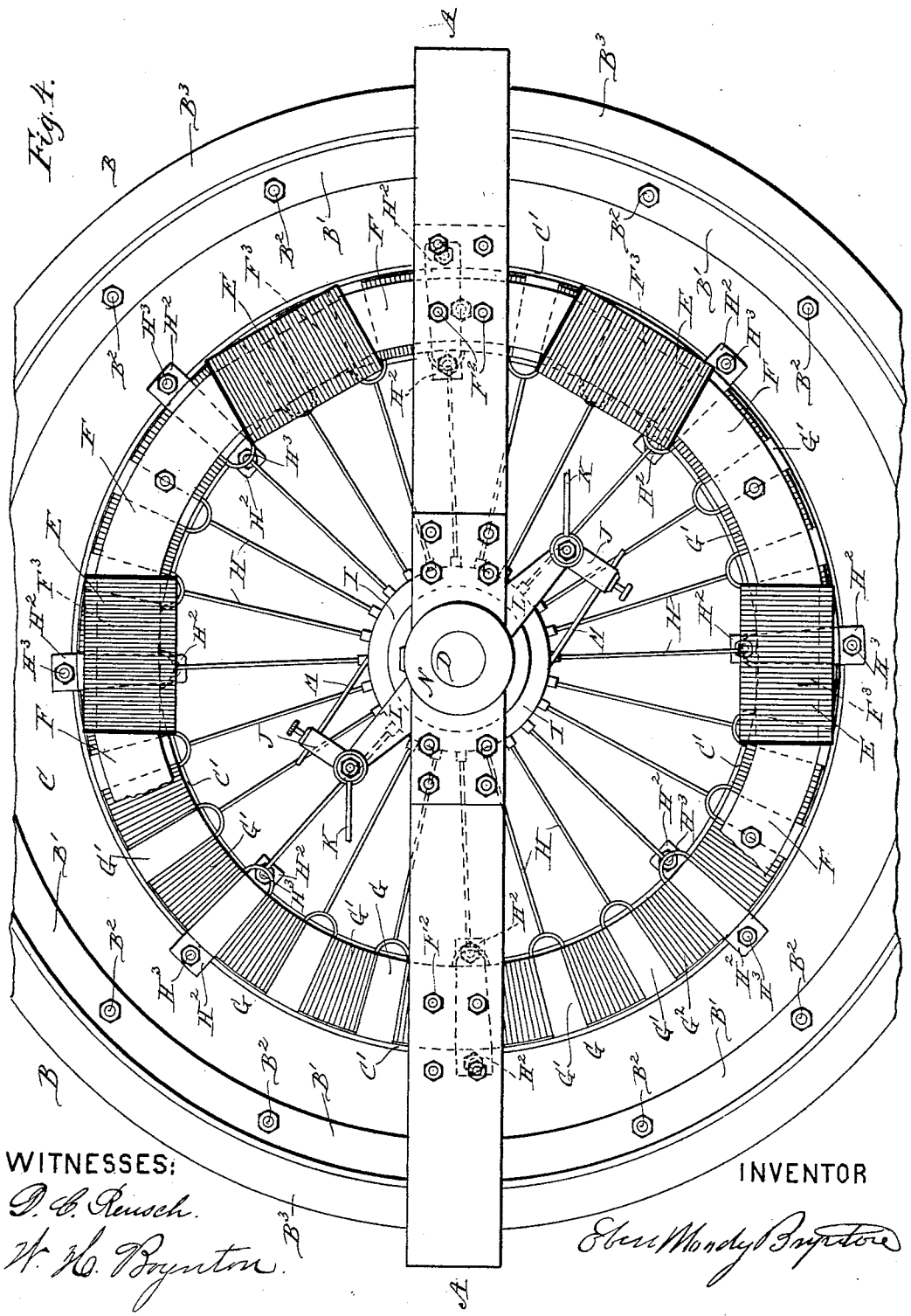
Figure 5:
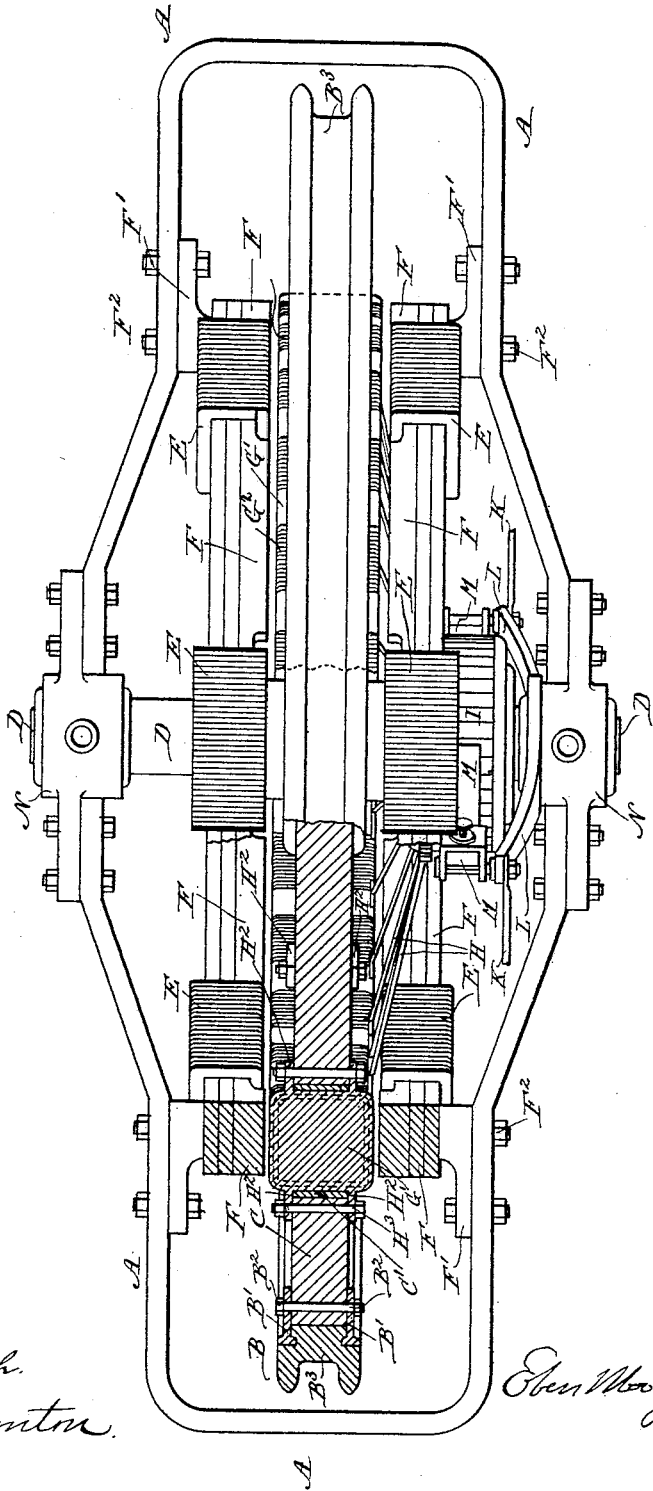
Figure 6:
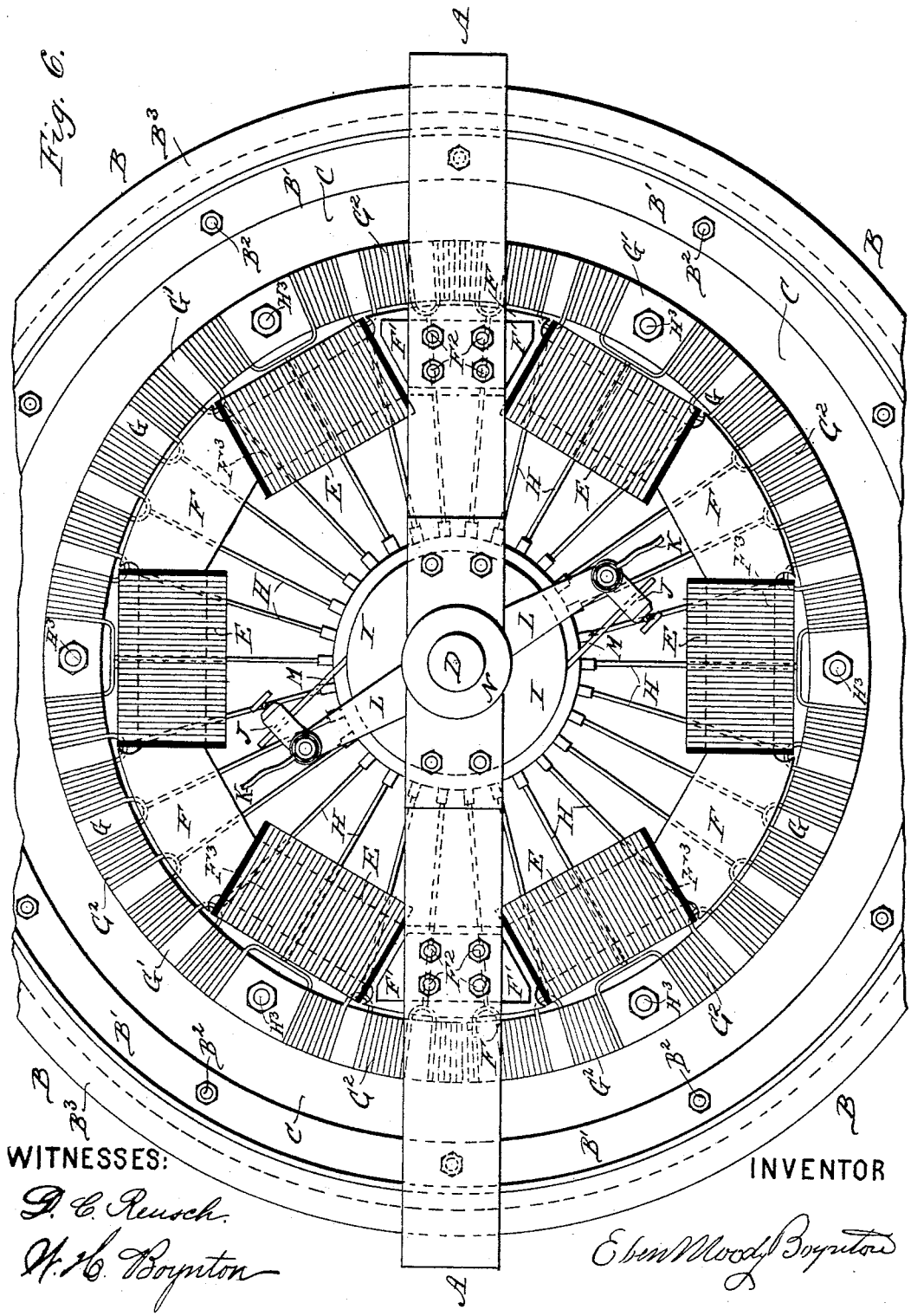

Figure 1 is an elevation of the motor; Fig. 2 a plan view of the same; Fig. 3 a sectional view, taken on line X X, Fig. 1. Fig. 4 is a variation of Fig. 1, partly broken away; Fig. 5 a plan view of Fig. 4, partly in section; Fig. 6, an elevation of a motor where the armature is outside of the field magnets.

Referring to the drawings, A is the frame of the motor and B a driving-wheel. I do not limit myself to any special form of this frame, as it may be of a construction suitable for the different conditions and places in which the same may be placed. In the drawings I have shown no connection between this frame A and the vehicle it is intended to propel, as this may be accomplished in many different ways, either leaving the frame in a measure independent of the vehicle, or connecting both rigidly with another. Neither do I limit myself to any special form of the wheel; in this illustration I have represented the latter as having a body or web of non-conducting material, but it may also be one provided with spokes or be made in any other form or of any other material.

$B^3$ is the wheel-tire and $B'$ $B'$ two metal rings arranged to connect $B^3$ to web C by means of bolts $B^2$.

$C'$ is the main hub provided with flanges inclosing the web and fastened to the latter by bolts $C^2$ $C^2$.

The wheel B carries an armature G fastened to it by bolts $H^3$; for this purpose the armature is at intervals provided with projections $H^2$ (Figs. 2 and 3), that rest against the ring $H'$, thus leaving a small interval between the armature and $H'$, in case ventilation of the coils should be necessary, or if a too close contact between armature and wheel should be undesirable. The object of the ring $H'$ is to bring the armature farther away from the wheel, thus making it unnecessary to place the field-magnets E in too close proximity to the wheel.

$G'$ is the armature core, $G^2$ the coils, and H the connections between the same and the commutator I.

L L are rocker-arms, J J the brush holders, M M the brushes and K K the terminals.

D is the shaft journaled in bearings N N. Surrounding the armature are field-coils E E and pole pieces F F, the latter together with the field-magnet cores $F^3$ being made of laminated iron and fastened to frame A by bolts $F^2$, a block $F'$ being inserted between the pole-pieces and frame. In cases where the material of the wheel-hub demands it, an annular plate $C^3$ is placed between it and the nuts of bolts $H^3$ to give additional strength. It will be seen that by this arrangement, the weight resting directly on the shaft D is considerably reduced, as the weight of the armature is transferred directly through the wheel-body to the wheel-tire, without the intervention of the shaft; further, the armature-spider being entirely done away with, the weight of the motor is still more reduced, as that of an armature-spider by such large diameter as would be required in this case, is very material. This reduction of weight of the revolving parts lessens the power necessary to overcome the inertia in starting and also the momentum in stopping; it further enables a vehicle propelled with such a motor to increase and decrease its maximum speed in shorter intervals of space and time than would be possible with a motor of more weight.

It is a known fact that the fastening of the armature-spider and driving wheel on the motor shaft has to be of a very substantial nature to stand the severe strains to which it is exposed in stopping and starting. It is obvious that by my method of fastening the armature to the driving wheel, these difficulties are entirely eliminated, as the connection between the driving wheel and shaft can be of a very inferior character, indeed may be dispensed with altogether, the propelling power not being transmitted through the shaft, but directly through the wheel-body. It is obvious that the arrangement as illustrated in Figs. 1, 2 and 3, may be duplicated on both sides of the wheel if desirable, also that the field-magnets may be placed alongside or inside of the armature if necessary, as shown in Figs. 5 and 6, respectively.

The form illustrated in Figs. 4 and 5 is a further variation. Instead of being fastened to the side of the wheel-web, the armature is made part of the latter. The same letters of reference are used as in the other figures. In this case the field-magnets are placed alongside the armature and connected to the frame A in the manner already described.

$H^2 H^2$ are projections on the armature core intended to embrace the wheel-web and fastened to this by bolt $H^3$; rings H' H' are here also inserted between the armature and wheel-web, where the latter is of too yielding a nature.

Having thus described my invention, I claim as new and desire to secure by Letters Patent—

1. In an electrically propelled vehicle the combination with the driving wheel of an armature fastened to the web of said wheel and acted upon by field magnets, so joined by their pole-pieces, that they together form a polygonal structure, in which the axes of the field-magnet coils are tangential to the circle inscribed in said polygon, having its center in the axis of said armature, substantially as set forth.

2. In an electrically propelled vehicle, the combination with the driving wheel of an armature fastened to the web of said wheel and acted upon by field magnets, so joined, by their pole-pieces, that they together form a polygonal structure, which is fastened to the motor frame and in which the axes of the field magnet coils are tangential to the circle inscribed in said polygon, having its center in the axis of said armature, substantially as set forth.

3. In an electrically propelled vehicle, the combination with the driving wheel of an armature inserted in the web of said wheel and acted upon by duplicate field magnets, each on opposite sides of the armature and so joined by their pole-pieces that they together form a polygonal structure in which the axes of the field magnet coils are tangential to the circle inscribed in said polygon, having its center in the axis of said armature, substantially as set forth.

4. In an electrically propelled vehicle the combination with the driving wheel of an armature inserted in the web of said wheel and acted upon by field magnets, so joined by their pole-pieces, that they together form a pologonal structure, which is fastened to the motor frame and in which the axes of the field magnet coils are tangential to the circle inscribed in said polygon, having its center in the axis of said armature, substantially as set forth.

Signed at New York, in the county of New York and State of New York, this 30th day of November, A. D. 1891.

EBEN MOODY BOYNTON.

Witnesses:
 D. C. REUSCH,
 W. H. BOYNTON.